(12) United States Patent
Baker

(10) Patent No.: US 10,782,825 B2
(45) Date of Patent: Sep. 22, 2020

(54) DISTINGUISHING NON-INPUT CONTACT

(71) Applicant: HEWLETT-PACKARD DEVELOPMENT COMPANY, L.P., Houston, TX (US)

(72) Inventor: Abu Baker, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/563,235

(22) PCT Filed: Jul. 28, 2015

(86) PCT No.: PCT/US2015/042505
§ 371 (c)(1),
(2) Date: Sep. 29, 2017

(87) PCT Pub. No.: WO2017/019043
PCT Pub. Date: Feb. 2, 2017

(65) Prior Publication Data
US 2018/0129349 A1   May 10, 2018

(51) Int. Cl.
*G06F 3/041* (2006.01)
*G06F 17/13* (2006.01)
*G06F 3/044* (2006.01)

(52) U.S. Cl.
CPC ............ *G06F 3/0418* (2013.01); *G06F 17/13* (2013.01); *G06F 3/044* (2013.01); *G06F 3/0412* (2013.01); *G06F 2203/04104* (2013.01)

(58) Field of Classification Search
None
See application file for complete search history.

(56) References Cited

U.S. PATENT DOCUMENTS

| 5,379,351 A | 1/1995 | Fandrianto et al. |
| 6,556,716 B2 | 4/2003 | Hong |
| 8,520,065 B2 | 8/2013 | Staats et al. |
| 2008/0055431 A1 | 3/2008 | Alakarhu et al. |

(Continued)

FOREIGN PATENT DOCUMENTS

| CN | 103593099 | 2/2014 |
| CN | 103947286 | 7/2014 |

(Continued)

OTHER PUBLICATIONS

Darren E. Butler et al., "Real-Time Adaptive Foreground/Background Segmentation," EURASIP Journal on Applied Signal Processing, Jan. 2, 2004, pp. 1-16, Hindawi Publishing Corporation.

(Continued)

*Primary Examiner* — Amare Mengistu
*Assistant Examiner* — Sarvesh J Nadkarni
(74) *Attorney, Agent, or Firm* — HPI Patent Department

(57) ABSTRACT

A method for distinguishing non-input contact with a touch-sensitive user input device includes converting an input frame from the touch-sensitive user input device to an input luminance frame; and filtering the input luminance frame, based on a base luminance frame, using a Wronskian function, the Wronskian function producing a filtered luminance frame, the filtered luminance frame distinguishing input contact from non-input contact with the touch-sensitive user input device.

15 Claims, 10 Drawing Sheets

(56) References Cited

U.S. PATENT DOCUMENTS

| | | | |
|---|---|---|---|
| 2010/0053109 A1* | 3/2010 | Narita | G06F 3/0418 345/173 |
| 2013/0234978 A1 | 9/2013 | Ksondzyk | |
| 2013/0265258 A1 | 10/2013 | Garfinkel et al. | |
| 2013/0328832 A1 | 12/2013 | Boumgarten | |
| 2013/0342502 A1* | 12/2013 | Wang | G06F 3/0416 345/174 |
| 2014/0168162 A1* | 6/2014 | Liao | G06F 3/042 345/175 |
| 2015/0002405 A1 | 1/2015 | Kuan et al. | |

FOREIGN PATENT DOCUMENTS

| | | |
|---|---|---|
| CN | 104737116 | 6/2015 |
| WO | WO-2013171747 A2 | 11/2013 |

OTHER PUBLICATIONS

Badri Subudhi, Ghosh, S., and Ghosh, A., 'Change Detection for Moving Object Segmentation with Robust Background Construction under Wronskian Framework', in Machine Vision and Applications (2013). 24. 795-809.

* cited by examiner

200

| 1 pF | 0 pF | 0 pF |
|---|---|---|
| 201-1 | 201-2 | 201-3 |
| 0 pF | 0 pF | 0 pF |
| 201-4 | 201-5 | 201-6 |
| 1 pF | 1 pF | 1 pF |
| 201-7 | 201-8 | 201-9 |

| 10 | 0 | 0 |
|---|---|---|
| 211-1 | 211-2 | 211-3 |
| 0 | 0 | 0 |
| 211-4 | 211-5 | 211-6 |
| 10 | 10 | 10 |
| 211-7 | 211-8 | 211-9 |

| 0 221-1 | 0 221-2 | 0 221-3 |
|---|---|---|
| 0 221-4 | 0 221-5 | 0 221-6 |
| 10 221-7 | 10 221-8 | 10 221-9 |

| 10 231-1 | 0 231-2 | 0 231-3 |
|---|---|---|
| 0 231-4 | 0 231-5 | 0 231-6 |
| 0 231-7 | 0 231-8 | 0 211-9 |

Fig. 2D

DISTINGUISHING NON-INPUT CONTACT

BACKGROUND

The use of touch-sensitive displays for user input to an electronic device has increased. This is due, in part to the ease of use and compactness associated with such touch-sensitive displays. Unlike computer input with a mouse or touch pad, touch input on the display allows for intuitive, direct interaction between the user and the graphical objects on the display. Touch-sensitive displays can improve the user's experience and productivity.

BRIEF DESCRIPTION OF THE DRAWINGS

The accompanying drawings illustrate various examples of the principles described herein and are a part of the specification. The examples do not limit the scope of the claims.

FIGS. 2A-2D are diagrams of rejecting non-input contact on a touch sensitive device, according to one example of principles described herein.

Throughout the drawings, identical reference numbers designate similar, but not necessarily identical, elements.

DETAILED DESCRIPTION

Figure 1:
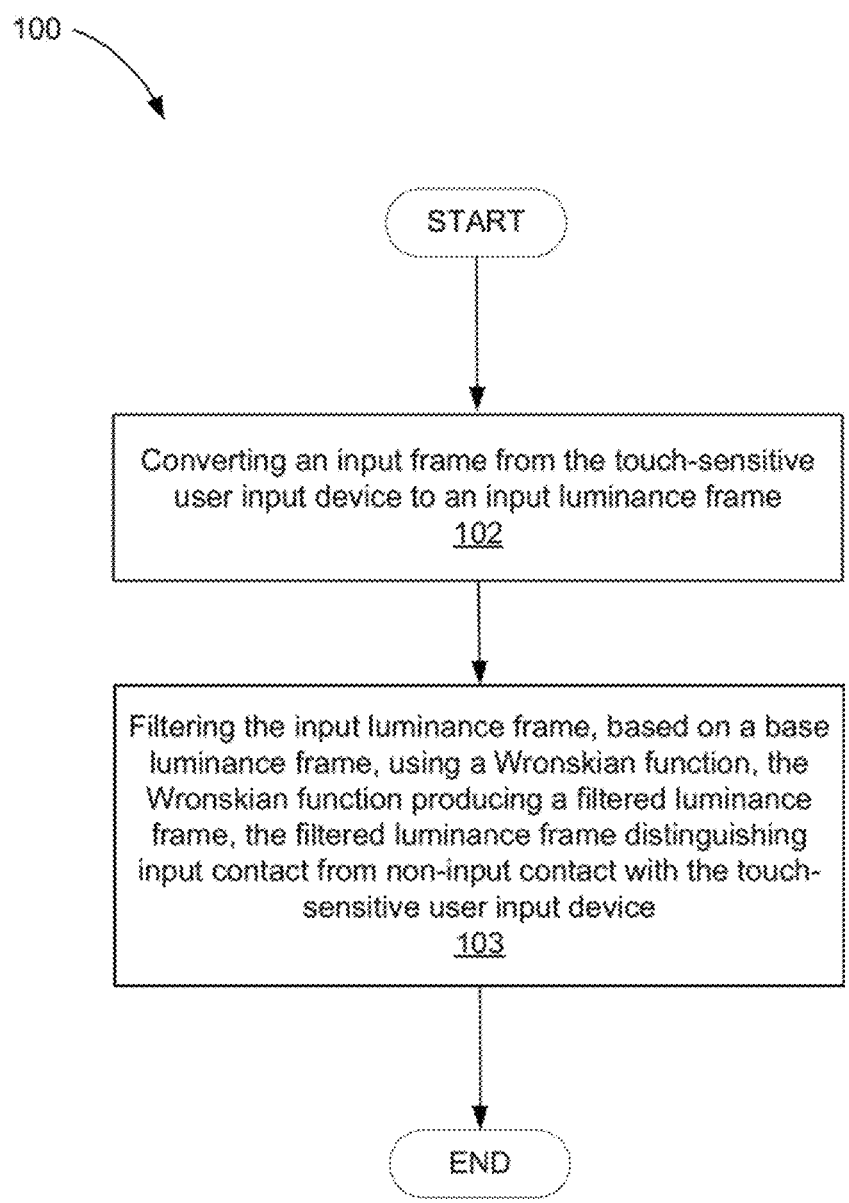
FIG. 1 is a flow chart of rejecting non-input contact on a touch sensitive device, according to one example of principles described herein.

As noted above, the use of touch-sensitive displays for computer input has increased because these devices offer ease of use and compactness. For example, a tablet computing device having a touch-sensitive display may be used for typing a message. A user may type on a displayed virtual keyboard showing on the touch-sensitive display. The tablet computing device monitors where the user touches the touch-sensitive display. The tablet computing device correlates the touches on the touch-sensitive display and the keyboard showing on the display to determine the keys the user intended to actuate and produces the corresponding typed message.

However, a user may not intend input with each contact to the touch-sensitive display. For example, when typing, a user typically avoids contact between his or her palms and the touch-sensitive display. When a user does rest a palm on the display, that contact is probably not be intended as input. However, the tablet computing device may register additional input on the keyboard or other elements shown on the display based on the contact with the user's palm. This additional input interferes with the desired input on the device.

To avoid unintended input, the user may attempt to hold the palms and other parts of the hand at a higher location, only touching the display with fingertips. Over time, this position may cause shoulder fatigue, giving the user discomfort. The additional fatigue may cause repetitive stress injuries to the user.

Consequently, a user may wish to, for example, rest his or her palms on the touch-sensitive display, at least momentary, for the sake of comfort, without that contact being interpreted by the machine as user input. Palm rejection (PR) technology seeks to distinguish between such non-input contact between the user's palms or other pasts of the hand not intended as user input and fingertip contact that is intended to effect user input.

Palm rejection technology extracts high level information from raw data using palm detection that is accurate and robust. Also, palm detection may be performed in the background while a computing device performs other tasks. As will be appreciated, palm rejection technology may reduce user fatigue and increase productivity and comfort.

Accordingly, the present specification describes examples of methods and systems for rejecting non-input contact on a touch-sensitive device. In one example, a system for distinguishing non-input contact on a touch-sensitive user input device includes a processor; a memory; a touch-sensitive user input device, communicatively coupled to the processor; and a Wronskian change detector, communicatively coupled to the processor. The Wronskian change detector includes a convert engine to convert an input frame from the touch-sensitive user input device to an input luminance frame; and a filter engine to filter the input luminance frame, based on a base luminance frame, using a Wronskian function, the Wronskian function producing a filtered luminance frame, the filtered luminance frame distinguishing input contact from non-input contact with the touch-sensitive user input device. In another example, a method for distinguishing non-input contact with a touch-sensitive user input device includes converting an input frame from the touch-sensitive user input device to an input luminance frame; and filtering the input luminance frame, based on a base luminance frame, using a Wronskian function, the Wronskian function producing a filtered luminance frame, the filtered luminance frame distinguishing input contact from non-input contact with the touch-sensitive user input device.

Still by way of example, the described method may use a Wronskian function which uses ratios of luminance values as a measure of change. A large mean or large variance of the luminance ratios increases the Wronskian value which can effectively distinguish between contact with the touch-sensitive display intended as input and non-input contact. This method may detect object interiors and structural changes. The Wronskian function is also robust against changes to illumination.

Further, the Wronskian function may be implemented in real time due to the nature of the Wronskian function and the resources used. The Wronskian function uses one previous data frame as a base reference for comparison to a current data frame. The use of one previous frame reduces the resources the Wronskian function uses when compared to other methods.

Still further, the method may use adaptive frequency hopping to select frames to filter to avoid spurious input. Spurious input from non-input contact may display a resonant frequency behavior. Adaptive frequency hopping, as will be described below, reduces the ability of the resonant frequency behavior of the non-input contact from registering as spurious input.

In another example, a computer program product for distinguishing non-input contact with a touch-sensitive user input device includes a non-transitory tangible computer readable storage medium. This computer readable storage medium includes computer readable program code comprising program instructions that, when executed, cause a processor to: select from a number of frames received from the touch-sensitive user input device an input frame, convert the input frame from the touch-sensitive user input device to an input luminance frame, filter the input luminance frame, based on a base luminance frame, using a Wronskian function, the Wronskian function producing a filtered luminance frame, the filtered luminance frame distinguishing input contact from non-input contact with the touch-sensitive user input device, and analyze the filtered luminance frame to identify input contact represented in the filtered luminance frame.

As used in the present specification and in the appended claims, the term "non-input contact" refers to incidental contact with a touch-sensitive device, whether with a user's palm or other object, that is not intended to result in input to the device.

As used in the present specification and in the appended claims, the term "frame" refers to a two-dimensional array of digital data representing the area of a touch-sensitive input device at an instant in time, the data indicating points of contact, both input and non-input contact, occurring at that point in time. For example, a frame may include an array of measurements of capacitance on a touch-sensitive user input device. Each element in the array represents a reading of capacitance for an area or pixel of the touch-sensitive display. A difference in measurements between elements of the frame indicates contact with the touch-sensitive user input device.

Further, as used in the present specification and in the appended claims, the term "Wronskian function" refers to a function performing calculations related to those introduced by Jó ozef Hoene-Wroński to calculate a determinate. A Wronskian function may be used to show linear independence.

Still further, as used in the present specification and in the appended claims, the term "Wronskian change detector" refers to a system that uses a Wronskian function to determine significant differences or changes between a base luminance frame and a data input frame.

Further, as used in the present specification and in the appended claims, the term "floating point" refers to a numeric value with a variable number of digits before and after a decimal point. As represented on a computing device, a floating point is represented by a series of binary digits. A first set of digits represents a mantissa, the mantissa represents the significant digits of the floating point. A second set of digits represents the exponent. The exponent represents a power of ten by which the mantissa is multiplied.

Further, as used in the present specification and in the appended claims, the term "real-time" refers to a computer device acting on data without intentional delay, given the processing limitations of the system and the time required to accurately measure the data. A real-time reading of data reads data from an input device as the input is detected.

Further, as used in the present specification and in the appended claims, the term "subset" refers to a part of a larger group of related things and is less than the entire group. A subset is a group of elements that are contained in another set.

Further, as used in the present specification and in the appended claims, the term "adaptive frequency hopping" refers to modulating the frequency used in a pseudo-random fashion to avoid interference when using a particular frequency. Adaptive frequency hopping may reduce the amount of interference experienced while performing a task.

Still further, as used in the present specification and in the appended claims, the term "luminance" refers to the intensity of input or output per unit area. The luminance of an image describes the image in terms of the light output per unit area, e.g., per pixel, of the image. The luminance of a frame from a touch-sensitive device describes areas where the device measures contact. A higher luminance value may represent contact with the touch-sensitive device, while lower luminance values indicate area not being contacted.

In the following description, for purposes of explanation, numerous specific details are set forth in order to provide a thorough understanding of the present systems and methods. It will be apparent, however, to one skilled in the art, that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a flowchart of rejecting non-input contact on a touch sensitive device, according to one example of principles described herein. After receiving a frame of data from a touch-sensitive user input device, the illustrated method begins by converting (102) the frame to an input luminance frame and then filtering (103) the input luminance frame, based on a base luminance frame, using a Wronskian function, the Wronskian function producing a filtered luminance frame, the filtered luminance frame distinguishing input contact from non-input contact with the touch-sensitive user input device. As will be described in greater detail below, the points of contact shown in the filtered luminance frame will be the input contacts and points of non-input contact will no longer be represented in the filter luminance frame.

In more detail, the method illustrated in FIG. 1 begins after a frame is received from a touch-sensitive input device, where the frame represents an array of contact measurements from the touch-sensitive input device taken at a particular point in time. Each measurement corresponds to an area on the touch-sensitive user input device and represents to what extent that area was experience contact at the moment in time the frame was taken. In one example, a user input device measures capacitance on the surface of a display. When a user touches the surface of the display, the capacitance changes based on that touch. An array or field of capacitance measurements taken over the touch-sensitive input device indicates where the touch-sensitive user input device was touched. Thus, the frame may be a two-dimensional array of capacitance measurements. The measurement units or variable measured may vary depending on the type of touch-sensitive user input device.

The frame is converted (102) to an input luminance frame. In this conversion, each capacitance measurement, for example, is represented in terms of luminance. The input luminance frame represents points of contact with the touch-sensitive input device as being relatively brighter or darker than other, untouched portions of the touch-sensitive input device. Thus the luminance frame provides data characterizing the frame without regard to the units measured on the touch-sensitive user-input device, such as capacitance.

The luminance frame may provide a single value for a measurement that comprises multiple values. In one example, the touch-sensitive user input device detects colors. When the input frame is converted (102) to an input luminance frame, the information about color is removed and a single value describes the contact. The luminance value may include a unit of measure, or may be expressed as a number without units.

Next, the input luminance frame is filtered (103) using a Wronskian function. The Wronskian function uses a base luminance frame to filter non-input contact from the input luminance frame to produce a filtered luminance frame. The Wronskian function serves to detect interior and structural changes. For example, the Wronskian function provides a filtered luminance frame that indicates where the touch-sensitive user input device has received input. Non-input contact is filtered and not represented in the filtered luminance frame. The Wronskian function may be robust against changes to illumination. For example, if the entire touch-screen display measures an increase in contact to electro-static charges while there is no input contact, the Wronskian function may suppress the measurement and not register input.

A specific example of the flowchart in FIG. 1 will be described using FIG. 2A-2D. FIG. 2A represents an input frame (200), as received from a touch-sensitive user input device. The input frame (200) represents a set of measurements for the touch-sensitive user input device. Each cell in the input frame (200) represents a measurement that corresponds to a portion of the touch-sensitive user input device. A controller may determine where the touch-sensitive user input device has received input by analyzing the input frame (200). As illustrated, a number of cells register increased capacitance, while a number of cells do not register capacitance. The cells 201-1, 201-7, 201-8, and 201-9 indicate a measurement of 1 pico Farad. The cells 201-2, 201-3, 201-4, 201-5, and 201-6 do not indicate the presence of capacitance.

FIG. 2B represents the input frame (FIG. 2A, 200) after it is converted (FIG. 1, 102) to a luminance frame (210). The luminance frame (210) provides an indication of activity on the touch-sensitive user input device. The luminance frame (210) may remove information, such as color or capacitance, to provide a single measurement of activity. As illustrated, the elements FIG. 2A, 201-1, 201-7, 201-8, and 201-9 are converted to indicate 10 on an activity scale. The elements FIG. 2A 201-2, 201-3, 201-4, 201-5, and 201-6 indicate no luminance or activity.

FIG. 2C represents a base luminance frame (220). The base luminance frame (220) may be based on an initial frame received from the touch-sensitive user input device. The base luminance frame (220) may be derived from a series of frames received from the touch-sensitive user input device. The base luminance frame (220) indicates that there is a positive luminance in elements 221-7, 221-8, and 221-9. The elements 221-1, 221-2, 221-3, 221-4, 221-5, and 221-6 indicate no luminance or activity.

The input luminance frame (FIG. 2B, 210) is filtered (FIG. 1, 103) by a Wronskian function using the base luminance frame (220). The Wronskian function filters non-input contact or measurements from the input luminance frame to create a filtered luminance frame.

FIG. 2D represents the filtered luminance frame (230) as produced by the Wronskian function. The filtered luminance frame (230) has filtered activity that was in the base luminance frame (FIG. 2C, 220). As illustrated, the activity corresponding to elements FIG. 2B, 211-7, 211-8 and 211-9 is filtered based on FIG. 2C 221-7, 221-8, and 221-9. As a result, the filtered luminance frame (230) does not indicate activity in 231-7, 231-8, and 231-9.

Figure 3:
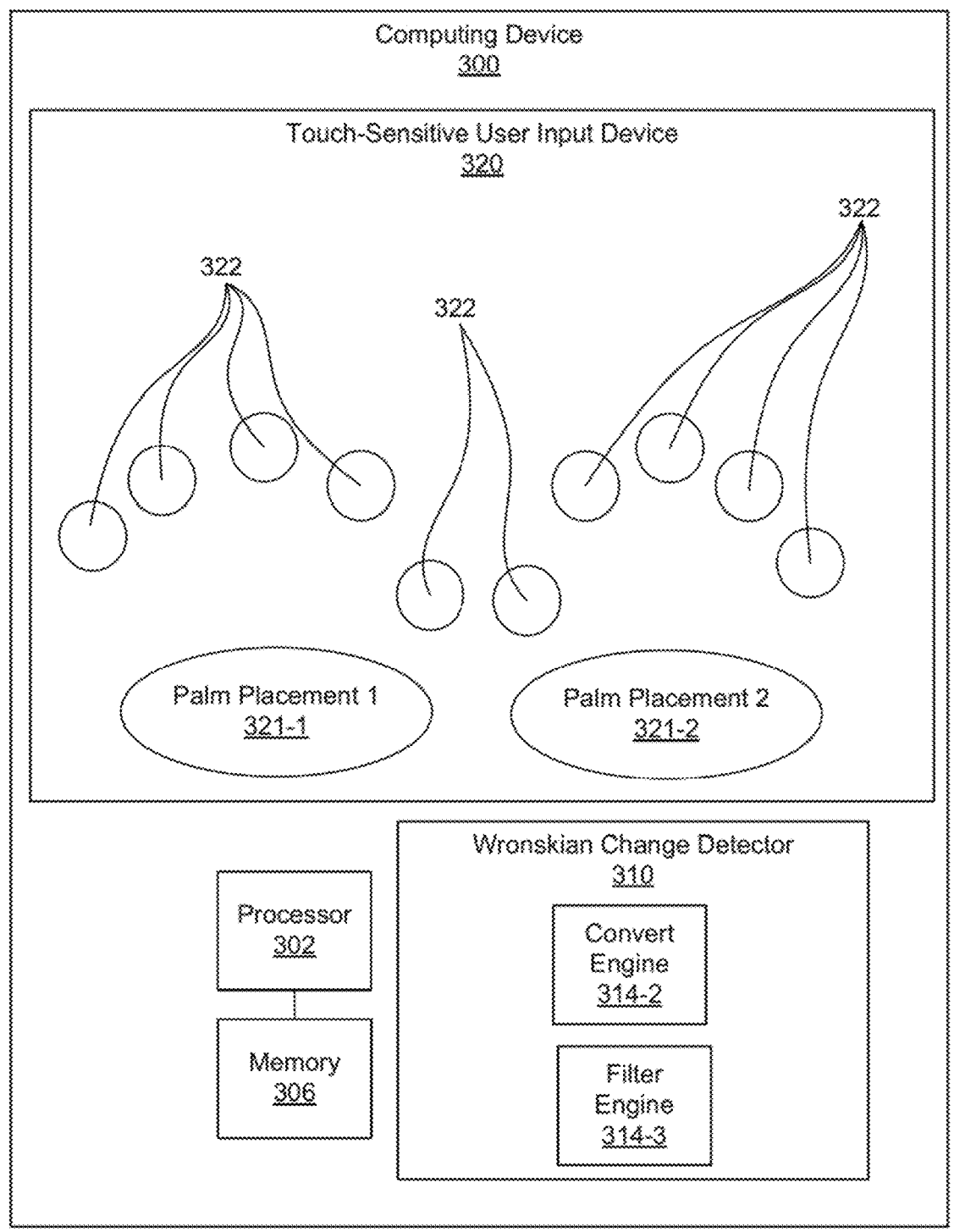
FIG. 3 is a diagram of rejecting non-input contact on a touch-sensitive device according, to one example of principles described herein.

FIG. 3 is a diagram of a system for distinguishing non-input contact with a touch-sensitive user input device. In this specific example, the non-input contact is contact between the user's palm and the touch-sensitive input device. Accordingly, the example is described in terms of rejecting palm contact on a touch-sensitive device. However, non-input contact can occur with any object, not just a user's palm, and can be distinguished according to the principles described herein.

In FIG. 3, a computing device (300) includes a Wronskian change detector (310) and a touch-sensitive user input device (320). A touch-sensitive user input device (320) may serve as both a display and a user input device. A user may use the touch-sensitive user input device (320) to provide user input to the computing device. The Wronskian change detector (310) reads input from the touch-sensitive user input device (320) and removes instances of contact that are likely unintended or non-input, such as a palm resting on the device while a user is typing. The Wronskian change detector (310) removes the non-input from the data frames and allows the data frame to be further processed by other systems related to the computing device (300).

In a common example, a user making typing motions on the touch-sensitive user input device (320) places their palms on the touch-sensitive user input device (320). The finger contacts (322) represent places on the touch-sensitive user input device (320) that the user touches with a fingertip. The finger contacts (322) are the input the device will process as user input. The touch-sensitive user input device (320) also receives input from the palm placement (321). The palm placement (321) is not intended as input to the touch-sensitive user input device (320). While the user types, the palm placement (321) may remain constant, or may move slightly as the user moves their fingers.

The Wronskian change detector (310) receives input from the touch-sensitive user input device (320) and filters unintended contact or movement, such as palm contact, and allows the computing device to process input data without the spurious input. As mentioned above and as will be described in more detail below, the Wronskian change detector (310) uses a Wronskian function to remove non-input contact detection from the data.

The Wronskian change detector (310) receives a number of input frames from the touch-sensitive user input device (320). As described above, the input frames are converted to luminance frames, where each input luminance frame corresponds to one of the input frames. The input luminance frame may be created by the Wronskian change detector, or the input luminance frame may be received by the Wronskian change detector.

As illustrated, the Wronskian change detector (310) includes a processor (302) and memory (308) communicatively connected to the processor (302). The Wronskian change detector (310) further includes a number of engines used in the implementation of the Wronskian change detector (310). The various engines within the Wronskian change detector (310) include executable program code that may be executed separately by a processor (302). In this example, the various engines may be stored as separate computer program products. In another example, the various engines within the palm rejection system (300) may be combined within a number of computer program products; each computer program product including a number of engines (314).

An engine comprises a combination of hardware and computer program code. The hardware may include a number of processors, a number of memory devices, a number of storage devices, a number of peripheral devices, or similar physical devices. The engines (314) may include a computer program code. The computer program code represents computer instructions that, when executed by the processor, cause a task to occur. In this illustration, the Wronskian change defector (310) includes a convert engine (314-2) and a filter engine (314-3).

The Wronskian change detector (310) uses a base luminance frame and an input luminance frame, each held in a corresponding frame buffer within the memory (308). Both frames are processed in a local neighborhood fashion with the Wronskian function. When a change is detected for a given element in the frame, the older element in the immediate preceding frame's buffer is overwritten with the new element. When no change is detected, the older element is replaced with a background indicator. Consequently, when the processing is done, the current frame resides in one frame buffer, and the same frame with its background removed, in accordance with the filtering results, resides in the other frame buffer. The filtered frame can then be transmitted for further use by the computing device (300).

The Wronskian change detector (310) includes a convert engine (314-2). The convert engine (314-2) converts an input frame from the touch-sensitive user input device to an input luminance frame. The input luminance frame provides a metric of activity for each element in the input frame. The input luminance frame is filtered by a Wronskian function.

The Wronskian change detector (310) includes a filter engine (314-3) to apply a Wronskian function to the input luminance frame and a base luminance frame. The Wronskian function creates a filtered luminance frame that removes non-input contact from the input frame. For example, the Wronskian function removes palm contact from the input frame. The Wronskian function uses a Wronskian of intensity luminance ratios to measure a change. A large mean or large variance of the intensity luminance ratios increases the value for the filtered element in the filtered luminance frame.

An example according to FIG. 3 will now be given. A user places their palms on the touch-sensitive user input device (320). The palms register as contact at palm placement A (321-1) and palm placement B (321-2). The user then proceeds to type with fingers contacting the finger contacts (322)

The convert engine (314-2) converts an input frame from the values read from the touch-sensitive user-input device to an input luminance frame. The input luminance frame indicates the activity for each element of the frame. The input luminance frame may remove units, such as farads or voltage, from the input frame.

The filter engine (314-3) filters the input luminance against a base luminance frame using a Wronskian function. In the illustrated example, the base luminance frame may include a palm contact area. The input luminance frame includes a similar but slightly shifted palm contact area. The Wronskian function identifies that the palm placement (321) has not changed between the base luminance frame and the incoming luminance frame in a manner that indicates input. The Wronskian function produces a filtered luminance frame that indicates the finger contacts (322) have been received as input, while other non-input contact is removed and ignored.

Figure 4:
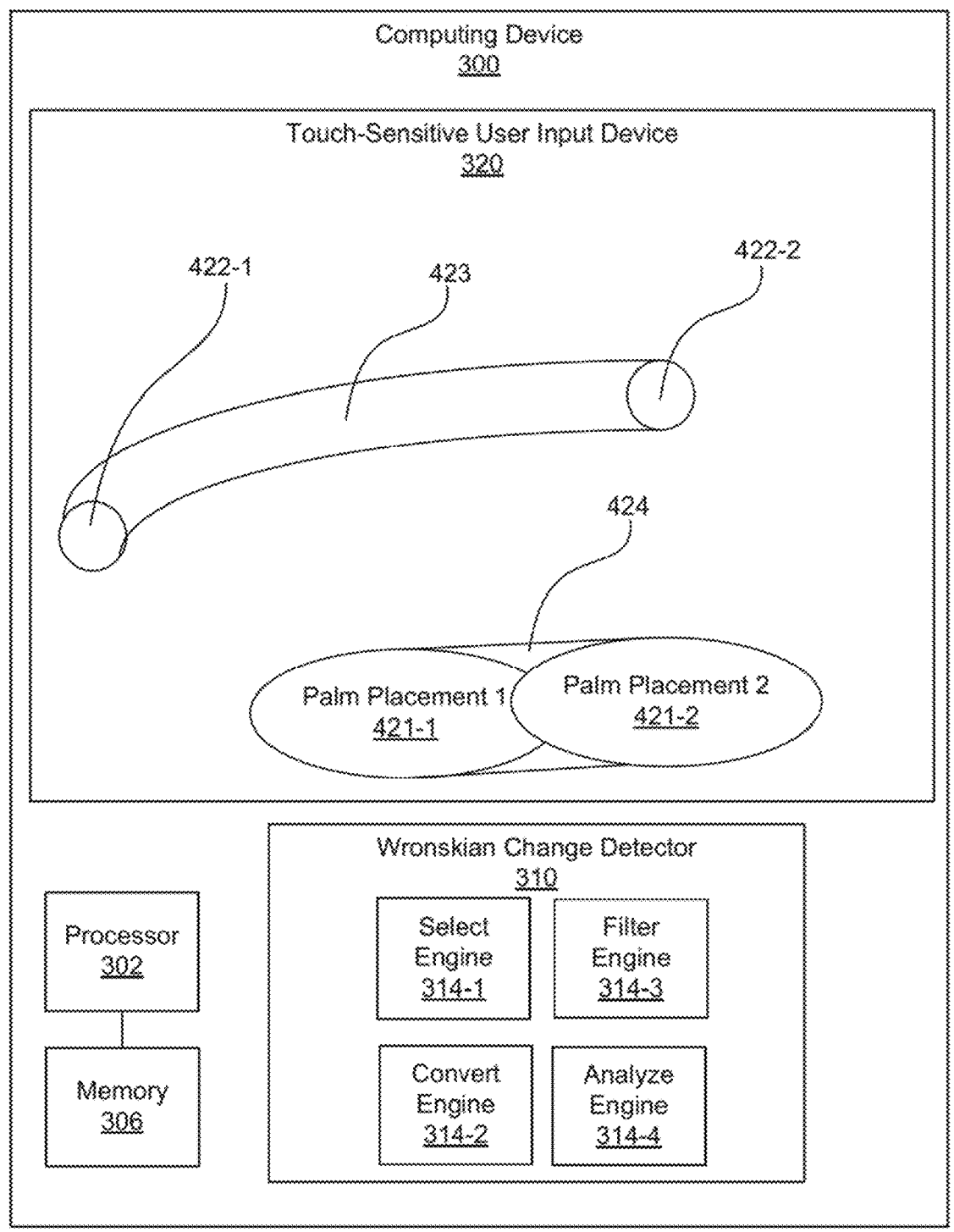
FIG. 4 is a diagram of rejecting non-input contact on a touch-sensitive device, according to one example of principles described herein.

FIG. 4 is a diagram of a system for rejecting non-input contact on a touch-sensitive device according to one example of the principles described herein. FIG. 4 illustrates another example of the Wronskian Change Detector (310) acting on user input. The computing device (300) is a computing device similar to that described in FIG. 3.

However, in FIG. 4, the Wronskian change detector (310) includes a select engine (314-1) to select an input frame from among the incoming frames to operate on to determine the input from the touch-sensitive user input device (320). The input frame measures the voltage, capacitance, or other unit denoting change on the touch-sensitive user input device, with a number of elements representing a number of areas on the touch-sensitive user input device. The select engine (314-1) receives frames when the touch-sensitive user input device (320) begins to detect input. The select engine (314-1) may select an input frame using adaptive frequency hopping. Adaptive frequency hopping selects a frequency for selecting an input frame from the incoming frames to reduce spurious readings. The selected frames then are filtered by the Wronskian change detector (310).

The Wronkskian change detector (310) also includes an analyze engine (314-4) to analyze the filtered luminance frame to create an input set which indicates what input the user intended to make without including non-input contact. The analyze engine (314-4) analyzes the filtered luminance frame to determine the changes that are relevant to a consumer of the data set. Additional spurious input or errors may be identified based on the filtered luminance frame. The additional spurious input have been removed from the filtered luminance frame. The analyzing engine (314-4) may make further analysis, or may transform and alter the data into a format used by an input set consumer.

An example according to FIG. 4 will now be given. In this example, a user places a single hand on the touch-sensitive user input device. The user initially places a palm at palm placement A (421-1). The user then makes contact with the touch-sensitive user input device with a finger at finger placement A (422-1). The user then moves the finger along a touch path (423) and the finger comes to rest at finger placement B (422-2). Though the user may not have intended it, the palm moves from palm placement A (421-1) to palm placement B (421-2) along a palm path (224).

As in the example of FIG. 3 above, the convert engine (314-2) converts the input frame to an input luminance frame. The input luminance frame indicates active input on the touch sensitive display. The filter engine (314-3) filters the input luminance frame using a Wronskian function comparing the input luminance frame against a base luminance frame. Each frame indicates a palm placement. The Wronskian function identifies that palm placement A (421-1) has not changed between the base luminance frame and the input luminance frame. The Wronskian change detector produces a filtered luminance frame that indicates a change at finger contact A (422-1).

As the user finger moves along the touch path (423), the select engine (314-1) continues to receive input frames. Frames are selected and compared against the base luminance frame. The filtered luminance frame from the prior application of the Wronskian function is used as a new base luminance frame. The filter engine (314-3) detects changes as a finger moves along the touch path (423). The filter engine (314-3) may detect movement of the palm along the palm path (224).

The analyze engine (314-4) analyzes the filtered luminance frame to determine what contact should be taken as intended input. The analyze engine may accordingly create an input set, which is a data set representing the input the user intended to make through the touch-sensitive user input device. The analyzing engine (314-4) may make further analysis and/or may transform the data into a different format used by an input set consumer.

Figure 5:
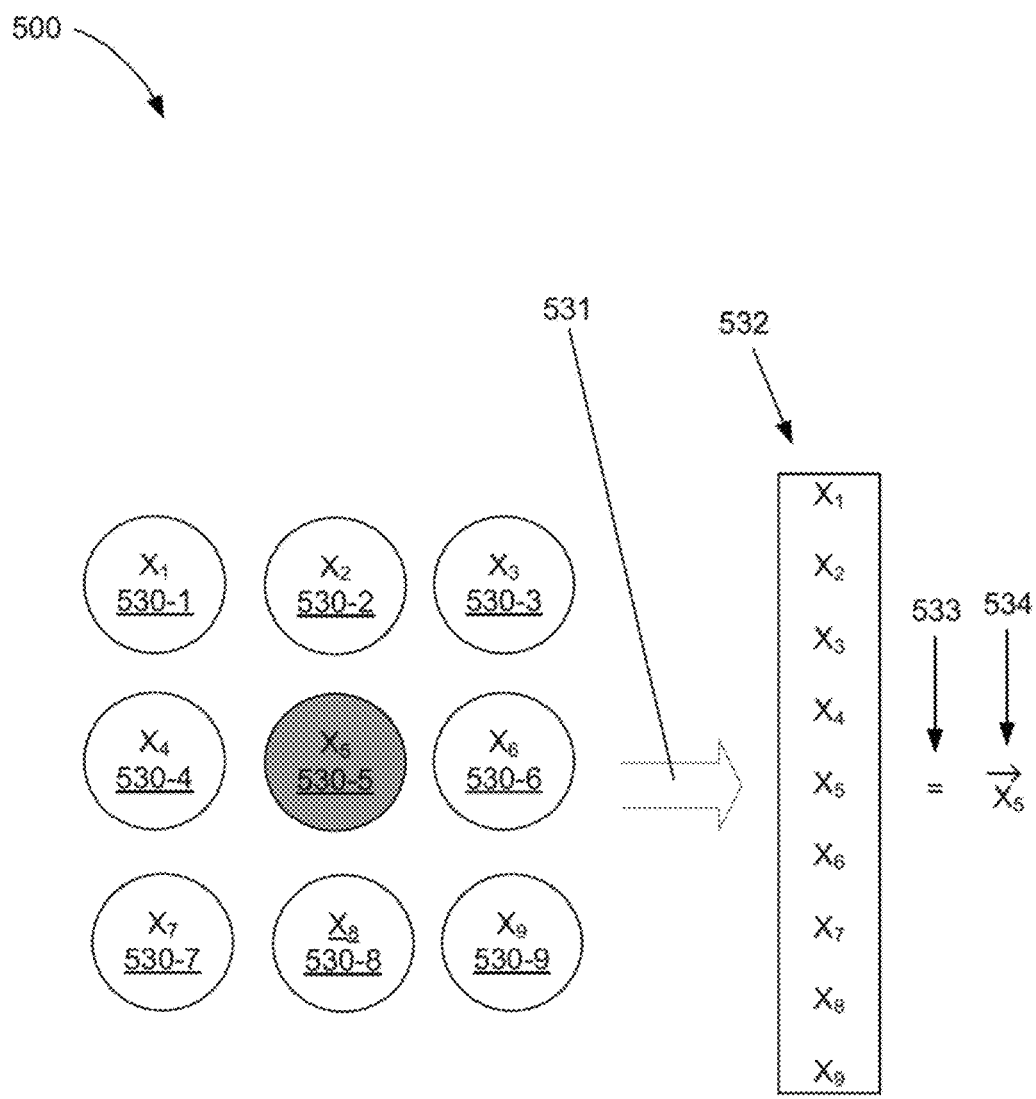
FIG. 5 is a diagram of using a Wronskian change detector to detect a change in luminance values in an input luminance frame, according to one example of principles described herein.

FIG. 5 is a diagram (500) of using a Wronskian change defector to defect a change in luminescence values in an input frame, according to one example of the principles described herein. FIG. 5 includes a series of elements (530). Each element represents a reading from an area of the touch-sensitive user input device (FIG. 3, 320). The Wronskian change defector uses a non-recursive technique classification. The frame is converted from a reading of the touch-sensitive user input device to an input luminance frame. The filter engine (FIG. 3, 314-3) forms (531) vectors, based on the luminance values in the input luminance frame and the base luminance frame, as shown in FIG. 4. An element (530-5) is replaced by a vector (532) formed by the Wronskian function with the element (530-5) and the adjoining elements (530). The adjoining elements (530) are a region of support for the element (530-5). A change is indicated when two vectors are linearly independent.

The Wronskian function uses the ratio of luminance values from two elements to quantify the difference between the elements. The Wronskian function is performed by the equation:

$$W\left(\frac{x_i}{y_i}\right) = \frac{1}{n}\left(\sum_{i=0}^{n} \frac{x_i^2}{y_i^2} - \sum_{i=0}^{n} \frac{x_i}{y_i}\right) = < TH$$

In this equation, W represents the Wronskian function operating on $x_i/y_i$ as the argument, x and y are components of the vector for the current frame and the previous frame, n is the dimension of the frames. TH is a threshold of input that indicates a change in the reading. An input frame may be different than that illustrated in FIG. 5. The Wronskian determinant identified may be less than or equal to the threshold. The threshold may be zero.

An input luminance frame and a base luminance frame are processed together in a local neighborhood fashion by the Wronskian function. The input luminance frame is based on a reading from a touch-sensitive user input device. The base luminance frame is used to detect changes occurring since the base luminance frame was read to the reading of the input luminance frame. The base luminance frame may be based on a first frame read from the touch-sensitive user input device when a filtered luminance frame has not been calculated, or may be a frame calculated using the Wronskian function.

When a change is detected for a given element, the element in the base luminance frame is overwritten with the new value. If no change is detected, the older element is replaced with a background value. When the processing is completed, the input luminance frame resides in one frame buffer, and the same image with its background removed, in accordance with the processing results, becomes the base luminance frame. The base luminance frame is then available for use in determining changes in another frame. The buffers may be implemented, for example, as part of the memory (306) of the device shown in FIGS. 3 and 4.

Each element (530) is modified using a filtering equation. The filtering equation may take the form:

$$D(x_i, y_i) = \frac{x_i}{y_i}\left(\frac{x_i}{y_i} - 1\right)$$

In this equation, D represents the Wronskian function for a single element, x and y are components of the vector for the input luminance frame and the base luminance frame, respectively. An element captures a range of possible values for this function within a number of thresholds. The element may limit the size or precision of the variables. For example, the Wronskian function may use eight bit signed integers as the result. The Wronskian function also provides precision within a threshold range. A threshold minimum, $TH_{min}$, represents a minimum threshold of change before the change is identified as significant. A threshold maximum, $TH_{max}$, indicates an upper limit to a measurement of a change, n represents the dimensions of an input frame. The partial range of $D(x_i,y_i)$ where $TH_{min} \leq D(x_i,y_i) \leq nTH_{max}$ is significant, where THmin and THmax are the minimum and maximum threshold to be used. Consequently, $D(x_i,y_i)$ complies with the following equation;

$$\frac{x_i^2}{y_i^2} - \frac{x_i}{y_i} - nTH_{max} = 0$$

The equation will then derive a ratio for $x_i/y_i$.

$$\frac{x_i}{y_i} = \frac{1 + \sqrt{1 + 4nTH_{max}}}{2}$$

In one example, the ratio of $x_i/y_i$ is represented by an 8-bit floating point value. In this example, three bits of the floating point value represent the mantissa, while five bits of the value represent the exponent. The 8-bit floating point value has a maximum storage of 4.443 before it overflows, causing an error. Using a vector with a dimension of 9, the value used for n is 9. The maximum threshold, represented by $TH_{max}$, is 1.7. Any greater value of THmax would cause the ratio of $x_i/y_i$ to exceed the range that can be stored by the 8-bit floating point value. The equation to calculate a value of a single element is then derived to be;

$$D(x_i, y_i) = 2^{10}\left[\frac{x_i}{y_i}\left(\frac{x_i}{y_i} - 1\right)\right]$$

This equation maintains precision within the range of the 8-bit floating point value, but may create a result that is too large to be summed n times in an 8-bit result. The six feast significant bits of the product may be removed after the multiplication, and the rest of the bits are employed as the result in the equation.

$$D(x_i, y_i) = 2^{10}\left[\frac{x_i}{y_i}\left(\frac{x_i}{y_i} - 1\right)\right]$$

The removal of the least significant bits in the result allows a result using a fixed bit representation, such as the 8-bit floating point example, to represent a larger range of thresholds.

Figure 6:
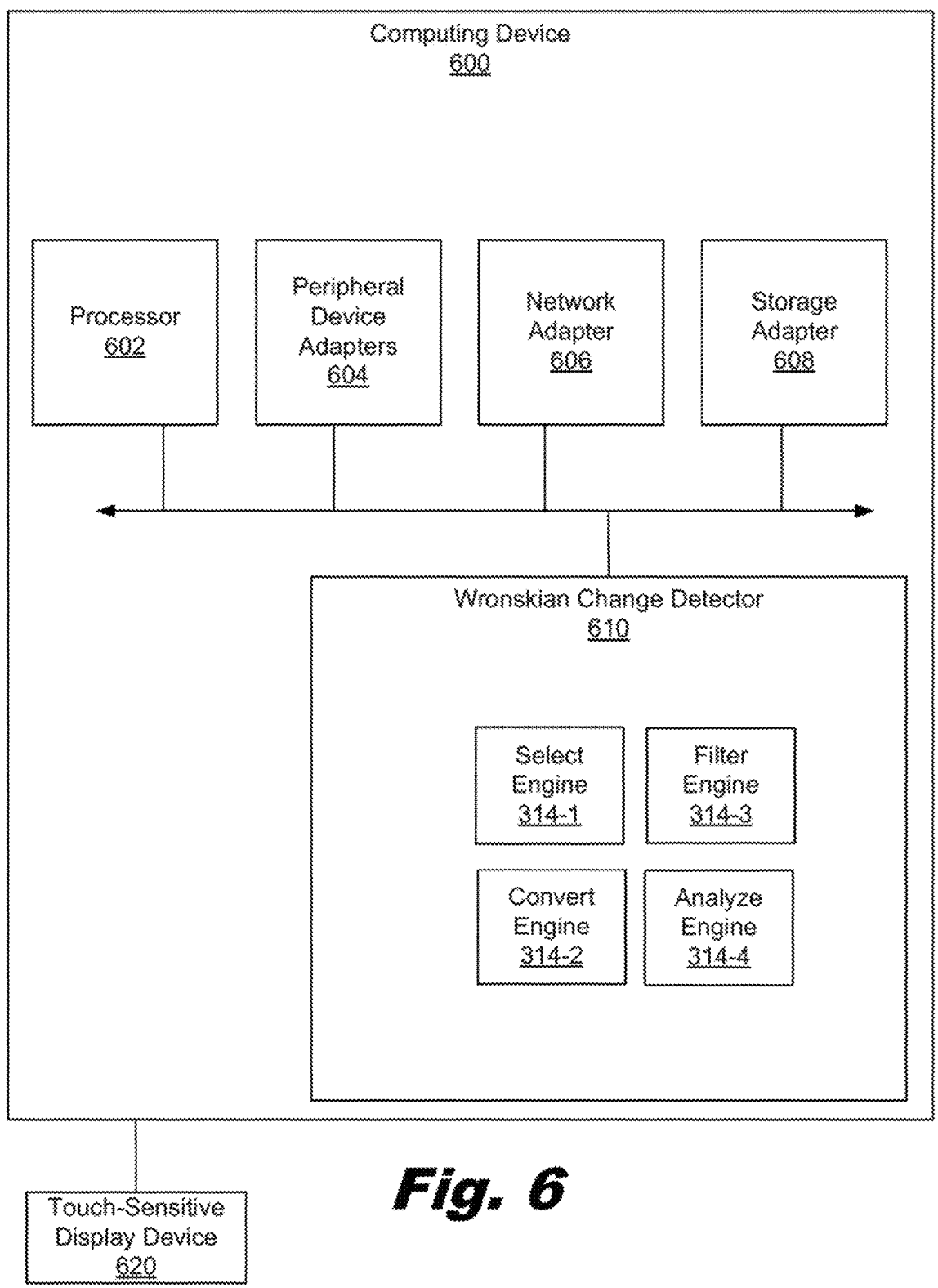
FIG. 6 is a diagram of a system for rejecting non-input contact on a touch-sensitive device, according to one example of principles described herein.

Referring now to the figures, FIG. 6 is a diagram of a system for rejecting non-input contact on a touch-sensitive device, according to one example of the principles described herein. As used in the present specification, the system for rejecting non-input contact on a touch-sensitive device may be a palm rejection system used as part of a tablet computing device so as to allow a user to rest their palms on the touch-sensitive surface of the device.

The computing system (600) may be implemented in an electronic device. Examples of electronic devices include servers, desktop computers, laptop computers, personal digital assistants (PDAs), mobile devices, smartphones, gaming systems, and tablets, or other electronic devices. The computing system (600) of FIG. 6 may be part of a general purpose computer. However, in alternative examples, the computing system (600) is part of an application-specific integrated circuit.

In some examples, the processor (602) and the Wronskian change detector (610) are located within the same physical component, such as a server or a network component. The Wronskian change detector (610) may be part of the physical component's main memory, caches, registers, non-volatile memory, or elsewhere in the physical component's memory hierarchy. Alternatively, the Wronskian change detector (610) may be in communication with the processor (802) over a network. Further, the data structures may be accessed from a remote location over a network connection, while the programmed instructions are located locally. Thus, the computing system (600) may be implemented on a user device, on a server, on a collection of servers, or combinations thereof.

The computing system (600) may be utilized in any data-processing scenario, including stand-alone hardware, mobile applications, a computing network, or combinations thereof. Further, the computing system (600) may be used in a computing network, a public cloud network, a private cloud network, a hybrid cloud network, other forms of networks, or combinations thereof. In one example, the methods provided by the computing system (600) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one, or across multiple, platforms. Such modules can run on various forms of cloud technologies and hybrid cloud technologies or offered as a SaaS (Software as a service) that can be implemented on or off the cloud. In another example, the methods provided by the computing system (600) are executed by a local administrator.

To achieve its desired functionality, the computing system (600) includes various hardware components. Among these hardware components may be a number of processors (602), a Wronskian change detector (610), a number of network adapters (606), a number of peripheral device adapters (604), and a number of storage adapters (608). These hardware components may be interconnected through the use of a number of buses and/or network connections. In one example, the processor (602), Wronskian change detector (610), peripheral device adapters (604), network adapter (608), and storage adapter (608) may be communicatively coupled via a bus.

The processor (602) may include the hardware architecture to retrieve executable code from the Wronskian change detector (610) and execute the executable code. The executable code may, when executed by the processor (602), cause the processor (602) to implement at least the functionality of removing palm contact, or similar non-input contact, from the input on a touch-sensitive user input device. The functionality of the computing system (600) is in accordance with the methods of the present specification described herein. In the course of executing code, the processor (202) may receive input from and provide output to a number of the remaining hardware units.

The Wronskian change detector (610) may include any memory capable of storing data such as programmed instructions or data structures used by the computing device (600) or may include an Application Specific Integrated Circuit (ASIC). The Wronskian change detector (610) may store data such as executable program code that is executed by the processor (602) or other processing device. As will be discussed, the Wronskian change detector (610) may specifically store computer code representing a number of applications that the processor (602) executes to implement at least the functionality described herein.

The Wronskian change detector (610) may interface with various types of memory, including volatile and non-volatile memory. For example, the Wronskian change detector (610) of the present example may include volatile random access memory (volatile RAM), read-only memory (ROM), and non-volatile random access memory (non-volatile RAM). Many other types of memory may also be utilized, and the present specification contemplates the use of as many varying type(s) of memory as may suit a particular application of the principles described herein. In certain examples, different types of memory may be used for different data storage needs. For example, in certain examples the processor (602) may hoot from ROM, maintain nonvolatile storage in the non-volatile RAM, and execute program code stored in volatile random access memory (volatile RAM).

Generally, the Wronskian change detector (610) may include a computer readable medium, a computer readable storage medium, or a non-transitory computer readable medium, among others. For example, the Wronskian change detector (610) may include an electronic, magnetic, optical, electromagnetic, infrared, or semiconductor system, apparatus, or device, or any suitable combination of the foregoing. More specific examples of the computer readable storage medium may include, for example, the following; an electrical connection having a number of wires, a portable computer diskette, a hard disk, a volatile random access memory (RAM), a read-only memory (ROM), non-volatile RAM (NVM) an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store computer usable program code for use by, or in connection with, an instruction execution system, apparatus, or device. In another example, a computer readable storage medium may be any non-transitory medium that can contain or store a program for use by, or in connection with, an instruction execution system, apparatus, or device.

The adapters (604, 606, 608) in the computing system (600) enable the processor (602) to interface with various other hardware elements, external and internal to the computing system (600). For example, the peripheral device adapters (604) may provide an interface to input/output devices, such as, for example, a display device (620), a mouse, a hard disk drive (HDD), a solid state drive (SSD) or a keyboard. The peripheral device adapters (604) may also provide access to other external devices, such as an external storage device, a number of network devices such as, for example, servers, switches, and routers, client devices, other types of computing devices, and combinations thereof. The touch-sensitive display device (620) may be provided to allow a user of the computing system (600) to interact with and implement the functionality of the computing system (600). The network adapter (608) may provide an interface to other computing devices within, for example, a network, thereby enabling the transmission of data between the computing system (600) and other devices located within the network.

The computing system (600) further includes a number of engines used in the implementation of the Wronskian change detector (610). The various engines within the Wronskian change detector (610) include executable program code that may be executed separately. In this example, the various engines may be stored as separate computer program products. In another example, the various engines within the Wronskian change detector (610) may be combined within a number of computer program products, each computer program product including a number of engines.

As mentioned above, the Wronskian change detector (610) includes a select engine (314-1) to select an input frame from a number of incoming frames. The select engine (314-3) may use adaptive frequency hopping to select a frequency at which incoming frames are sampled to reduce input noise while reading the subset of incoming frames As mentioned above, the Wronskian change defector (610) includes a convert engine (314-2) to convert the input frame to an input luminance frame. The input luminance frame provides an alternative representation of the input frame that is used by the Wronskian function.

As mentioned above, the Wronskian change detector (610) includes a fitter engine (314-4) to filter the input luminance frame using a Wronskian change function. The Wronskian function uses a base luminance frame to filter the input luminance frame. The Wronskian function removes non-input contact from the input luminance frame. The Wronskian Function produces a filtered luminance frame.

The Wronskian change detector (610) includes an analyze engine (314-4) to analyze the filtered luminance frame to create an input set. The analyze engine (314-4) analyzes the filtered luminance frame to determine the changes that are relevant to a consumer of the data set. Spurious input or errors may be identified and removed from the filtered luminance frame.

Figure 7:
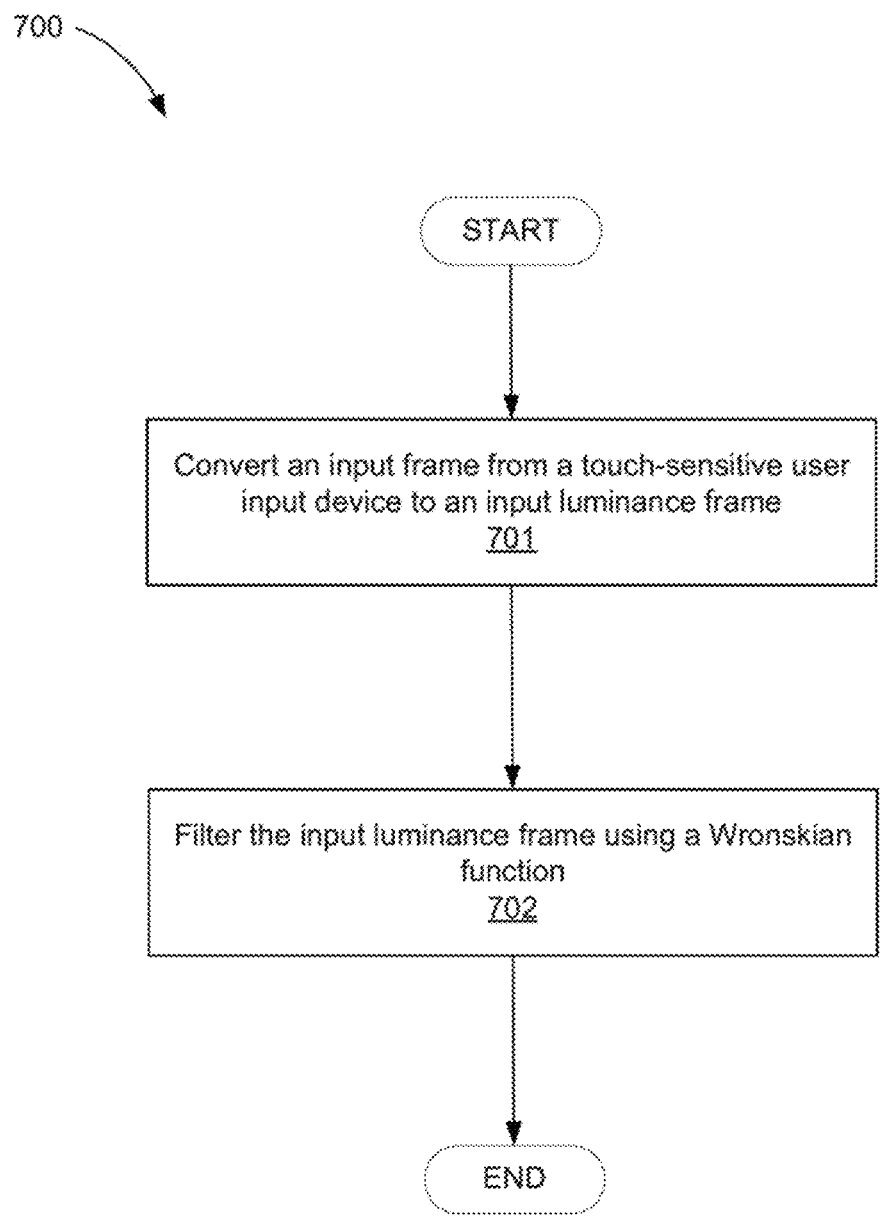
FIG. 7 is a flowchart of a method for rejecting non-input contact on a touch-sensitive device, according to one example of principles described herein.

FIG. 7 is a flowchart of a method (700) for rejecting non-input contact on a touch-sensitive device, according to one example of the principles described herein. In one example, the method (700) may be executed by the Wronskian change defector (310) of FIG. 3. In other examples, the method (700) may be executed by other systems (i.e. system 900). In this example, the method (700) includes converting (701) an input frame from the touch-sensitive user input device to an input luminance frame. The method (700) includes filtering (702) the input luminance frame, based on a base luminance frame, using a Wronskian function.

The method (700) may include converting (701) an input frame from a touch-sensitive user input device to a luminance frame. The converting (701) may alter data in the input frame to allow a Wronskian function to operate on the data.

The method (700) also includes filtering (702) the input luminance frame, based on a base luminance frame, using a Wronskian function. The Wronskian function produces a filtered luminance frame. The filtered luminance frame distinguishes input contact from non-input contact with the touch-sensitive user input device. The Wronskian change defector removes input from palm contact or similar contact on the touch-sensitive user-input device (FIG. 3, 320).

Figure 8:
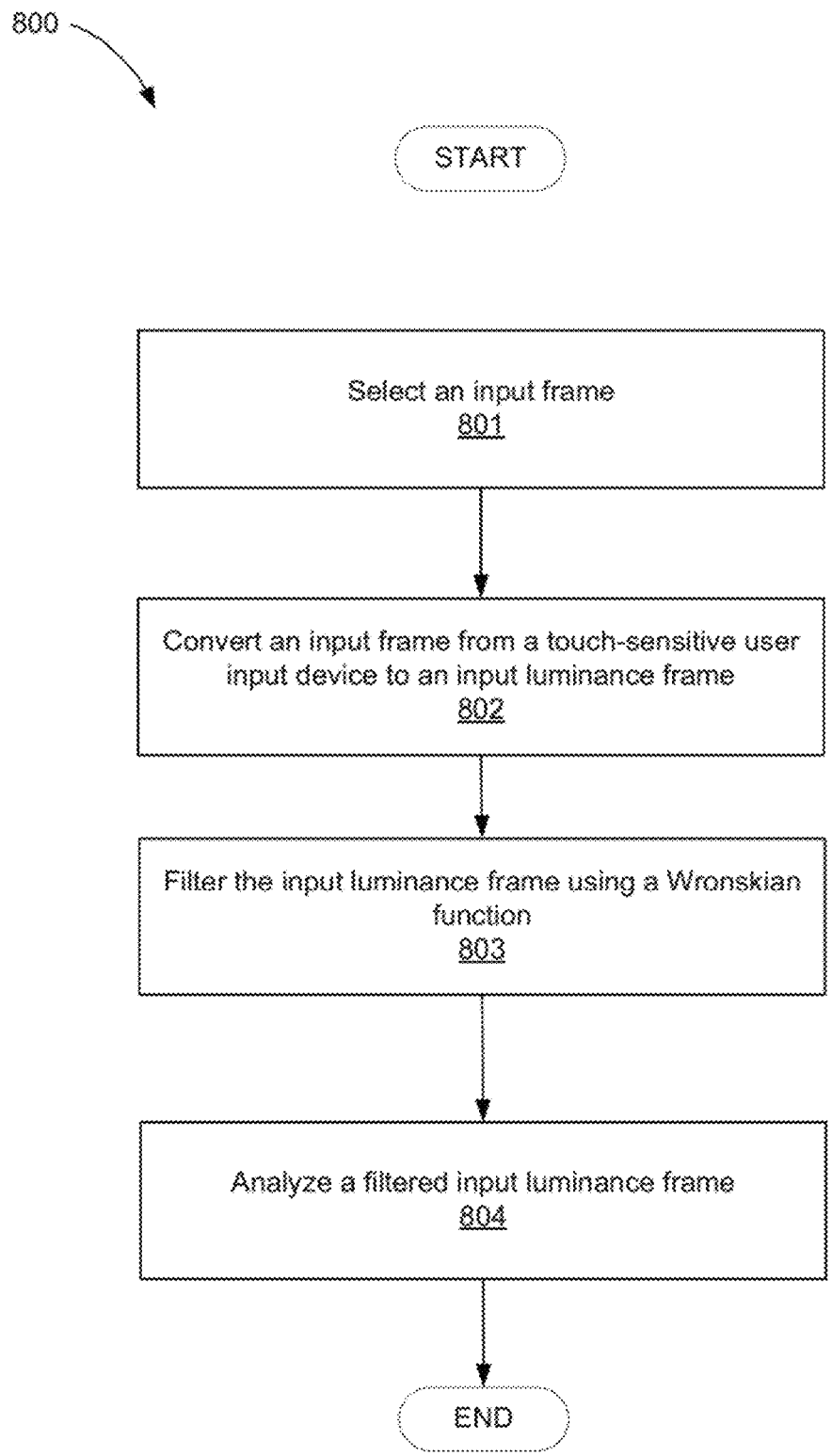
FIG. 8 is a flowchart of a method for rejecting non-input contact on a touch-sensitive device, according to one example of principles described herein.

FIG. 8 is a flowchart of a method (800) for rejecting non-input contact on a touch-sensitive device, according to one example of the principles described herein. In one example, the method (800) may be executed by the Wronskian change detector (310) of FIG. 3. In other examples, the method (800) may be executed by other systems (i.e., system 900). In this example, the method (900) includes selecting (801) from a number of frames received from the touch-sensitive user input device an input frame. The method (800) includes converting (802) an input frame from the touch-sensitive user input device to an input luminance frame. The method (800) includes filtering (803) the input luminance frame, based on a base luminance frame, using a Wronskian function. The method (800) includes analyzing (804) the filtered luminance frame to identify input contact represented in the filtered luminance frame The method (800) includes selecting (801), from a number of frames received from the touch-sensitive user input device, an input frame. The selecting (801) may use adaptive frequency hopping to reduce non-input readings to the touch-sensitive user input device.

As described above, the method (800) includes converting (802) an input frame from the touch-sensitive user input device to an input luminance frame. As described above, the method (800) includes filtering (803) the input luminance frame, based on a base luminance frame, using a Wronskian function.

The method (800) includes analyzing (804) the input change map to further adjust the input, to avoid un-intended input. The analyzing (804) may include making calculations for adaptive frequency hopping or removing additional non-input contact.

Figure 9:
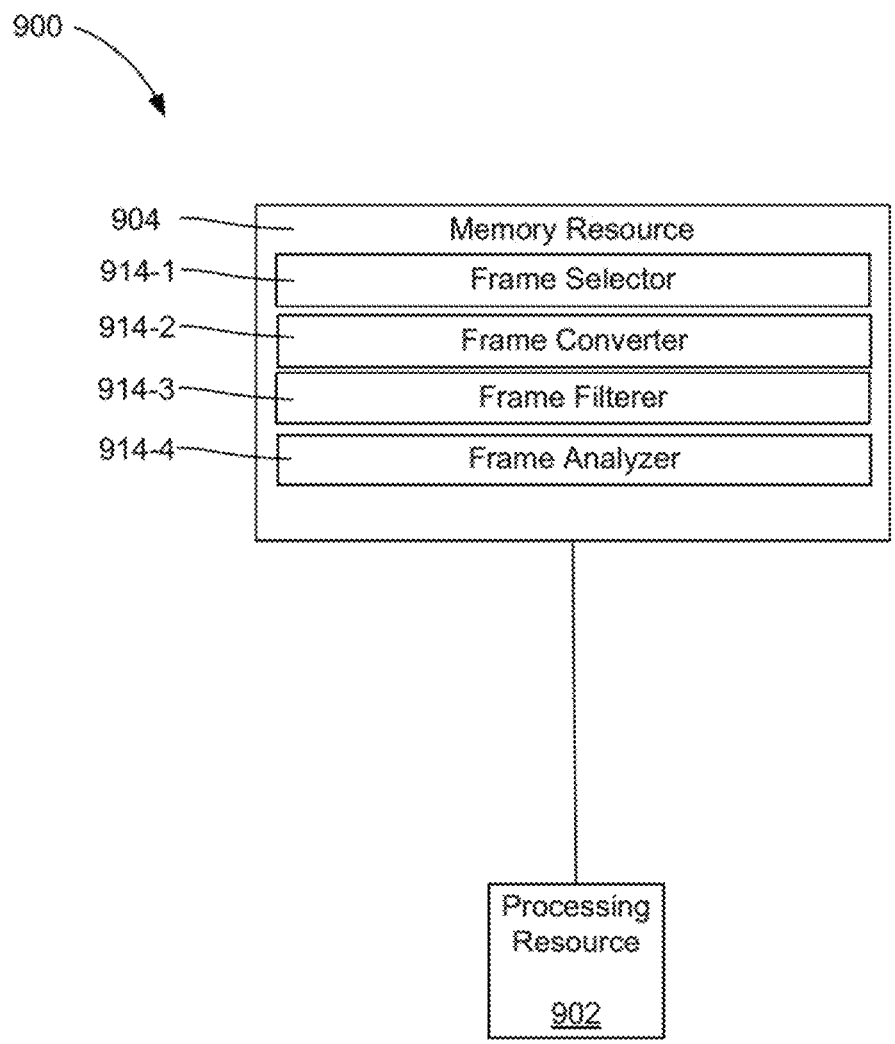
FIG. 9 is a diagram of a computer program product for non-input contact on a touch-sensitive device, according to one example of principles described herein.

FIG. 9 is a diagram of an example of a Wronskian change detector (900), according to the principles described herein. In this example, the Wronskian change detector (900) includes processing resources (902) that are in communication with memory resources (904). Processing resources (902) includes at least one processor and other resources used to process programmed instructions. The memory resource (904) represents any memory capable of storing data, such as programmed instructions or data structures used by the Wronskian change detector (900). The programmed instructions shown stored in the memory resources (904) include a frame selector (914-1), a frame converter (914-2), a frame filterer (914-3), and a frame analyzer (914-4).

The memory resources (904) include a computer readable storage medium that contains computer readable program code to cause tasks to be executed by the processing resources (902). The computer readable storage medium may be a tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable programmable read only memory, other types of memory, or combinations thereof.

The frame selector (914-1) represents programmed instructions that, when executed, cause the processing resource (902) to selects an incoming frame as an input frame. Incoming frames represent a reading from a touch-sensitive user input device (FIG. 3, 320). The frame selector (914-1) may use adaptive frequency hopping.

The frame converter (914-2) represents programmed instructions that, when executed, cause the processing resource (902) to convert an input frame to an input luminance frame. The input luminance frame is used by a Wronskian function to filter the input.

The frame filterer (914-3) represents programmed instructions that, when executed, cause the processing resource (904) to filter an input luminance frame using a Wronskian function. The Wronskian function uses a base luminance frame and the input luminance frame to identify input to the touch-sensitive user input device. The frame filterer produces a filtered luminance frame.

The frame analyzer (914-4) analyzes the filtered input frame produced by the frame filter (914-3). The input change map analyzer (914-5) analyzes the filtered luminance frame to determine where the touch-sensitive user input device (FIG. 3, 320) was touched.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 4, 202) of the computing system (FIG. 4, 200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The use of a Wronskian change detector allows for a fast and efficient analysis of data input on a touch-sensitive user input device. The Wronskian change detector allows for data analysis while not consuming resources, such as processor time or memory. The Wronskian change detector allows for the use of adaptive frequency hopping to avoid spurious input. The Wronskian change detector allows for effective detection of non-input contact on a touch-sensitive user-input device.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:
a processor;
a memory communicatively coupled to the processor, the memory storing instructions executable by the processor to:
convert a non-luminance input frame from a touch-sensitive user input device to an input luminance frame by converting a plurality of capacitance measurements, detected in response to touches on a surface of the touch-sensitive user input device, to a luminance measurement for each of a plurality of portions of the surface of the touch-sensitive user input device, wherein the input luminance frame represents points of input contact with the touch-sensitive input device as brighter or darker than portions of non-input contact of the touch-sensitive input device; and
filter the input luminance frame, based on a base luminance frame, using a Wronskian function, the Wronskian function producing a filtered luminance frame, the filtered luminance frame further distinguishing input contact from non-input contact with the touch-sensitive user input device.

2. The system of claim 1,
wherein the non-luminance input frame comprises a number of elements, each element representing a measurement from an area of the touch sensitive user-input device; and
wherein the Wronskian function comprises subtracting a sum of ratios of an element in the input luminance frame and a corresponding element of the base luminance frame from a sum of ratios of a square of the element in the input luminance frame and a square of the corresponding element of the base luminance frame and dividing the result by a number of elements in the input luminance frame to create an element in the filtered luminance frame.

3. The system of claim 1, further comprising instructions to select the non-luminance input frame from among a number of non-luminance frames received from the touch-sensitive user input device.

4. The system of claim 3, further comprising instructions to utilize adaptive frequency hopping to select the non-luminance input frame.

5. The system of claim 1, further comprising instructions to analyze the filtered luminance frame to identify input contact represented in the filtered luminance frame.

6. A method, comprising:
converting a non-luminance input frame from a touch-sensitive user input device to an input luminance frame by converting a plurality of capacitance measurements, detected in response to a plurality of touches on a surface of the touch-sensitive user input device, to a luminance measurement for each of a plurality of portions of the surface of the touch-sensitive user input device, wherein the input luminance frame represents points of input contact with the touch-sensitive input device as brighter than portions of non-input contact of the touch-sensitive input device; and
filtering the input luminance frame, based on a comparison of the input luminance frame to a previously collected base luminance frame, using a Wronskian function, the Wronskian function producing a filtered luminance frame, the filtered luminance frame further distinguishing input contact from non-input contact with the touch-sensitive user input device by removing a luminance measurement, corresponding to a first detected touch of the plurality of detected touches present at a first portion of the surface of the touch-sensitive input device in the input luminance frame, from the input luminance frame responsive to an identification of a second luminance measurement indicating that the first detected touch was also detected at a corresponding first portion of the previously collected base luminance frame.

7. The method of claim 6, wherein the non-luminance input frame comprises a number of elements, each element representing a measurement from an area of the touch sensitive user-input device.

8. The method of claim 7, wherein the Wronskian function comprises subtracting a sum of ratios of an element in the input luminance frame and a corresponding element of the base luminance frame from a sum of ratios of a square of the element in the input luminance frame and a square of the corresponding element of the base luminance, frame and dividing the result by a number of elements in the input luminance frame to create an element in the filtered luminance frame.

9. The method of claim 6, further comprising selecting the non-luminance input frame from among a number of frames received from the touch-sensitive user input device.

10. The method of claim 9, wherein selecting the non-luminance input frame uses adaptive frequency hopping.

11. The method of claim 9, wherein the number of received frames are received in real-time.

12. The method of claim 6, further comprising analyzing the filtered luminance frame to identify input contact represented in the filtered luminance frame.

13. The method of claim 6, wherein the Wronskian function filters values outside of a threshold range.

14. A non-transitory machine-readable storage medium having stored thereon machine-readable instructions to cause a computer processor to:
    select, from a number of frames received from the touch-sensitive user input device, a non-luminance input frame including a plurality of non-luminance measurements of touches on a surface of the touch-sensitive user input device;
    convert the non-luminance input frame from the touch-sensitive user input device to an input luminance frame by converting a portion of the plurality of non-luminance measurements to a luminance value characterizing activity at each of a plurality of portions of the surfaces of the touch-sensitive user input device without regard to a unit of measurement of each of the plurality of non-luminance measurements, wherein the input luminance frame represents points of contact with the touch-sensitive input device as darker than untouched portions of the touch-sensitive input device;
    filter the input luminance frame, based on a base luminance frame, using a Wronskian function, the Wronskian function producing a filtered luminance frame, the filtered luminance frame distinguishing input contact from non-input contact with the touch-sensitive user input device; and
    analyze the filtered luminance frame to identify input contact represented in the filtered luminance frame.

15. The product of claim 14,
wherein the non-luminance input frame comprises a number of elements, each element representing a measurement from an area of the touch sensitive user-input device; and
wherein the Wronskian function comprises subtracting a sum of ratios of an element in the input luminance frame and a corresponding base element of the base luminance frame from a sum of ratios of a square of the element in the input luminance frame and a square of the corresponding element of the base luminance frame, and dividing the result by a number of elements in the non-luminance input frame to create an element in the filtered luminance frame.

* * * * *